Feb. 24, 1931.                C. L. MACKEY                1,794,237
                        AUTOMATIC AIR RELEASE VALVE
                           Filed Feb. 17, 1928
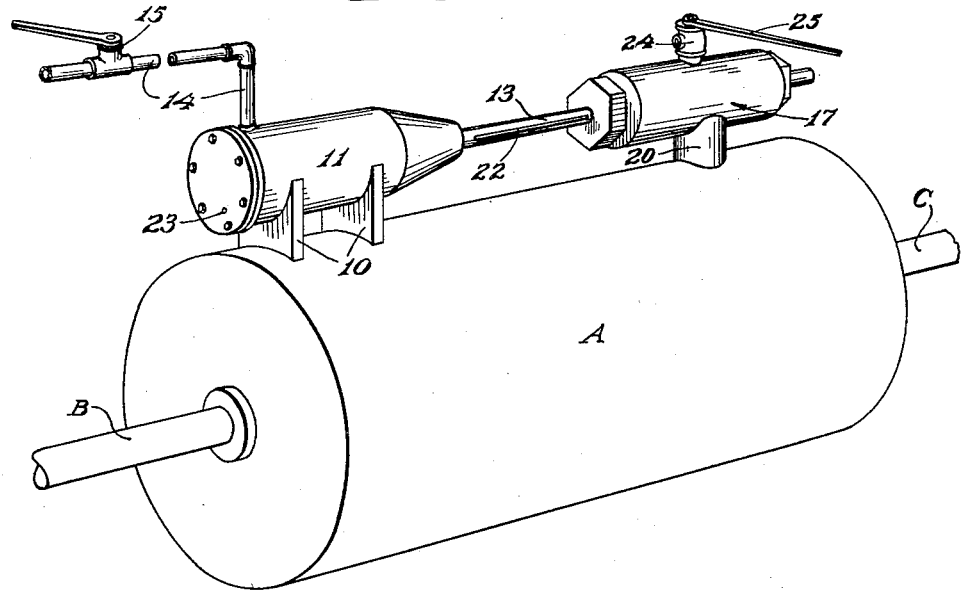
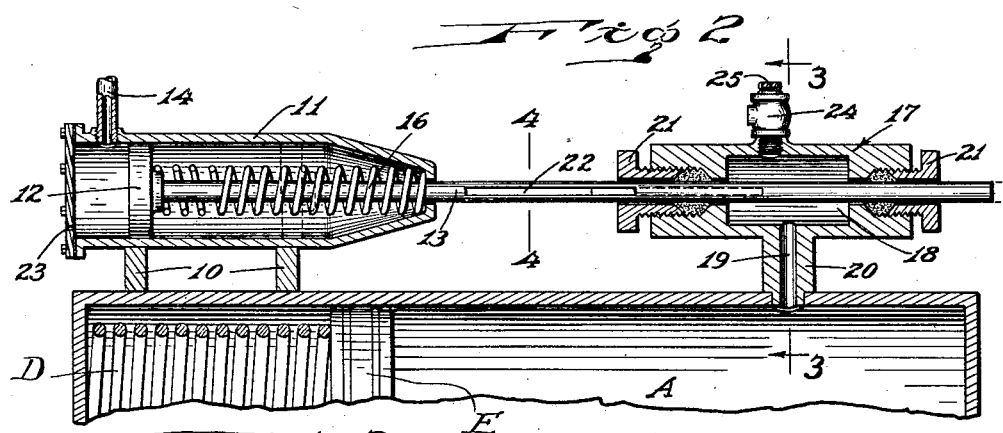
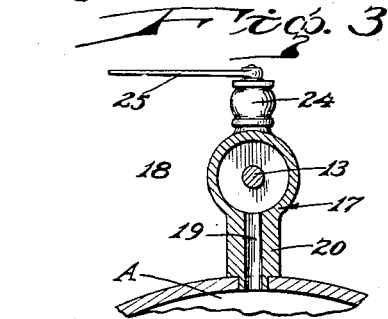
CHRISTOPHER L. MACKEY
                     INVENTOR
BY Victor J. Evans
                     ATTORNEY Patented Feb. 24, 1931

1,794,237

UNITED STATES PATENT OFFICE

CHRISTOPHER L. MACKEY, OF NEW YORK, N. Y.

AUTOMATIC AIR-RELEASE VALVE

Application filed February 17, 1928. Serial No. 255,080.

This invention relates to improvements in automatic air release valves for air brake systems.

The primary object of the invention resides in an air release valve for use in connection with the respective air brake cylinders of a train to facilitate the release of one or more cars of a train which is controlled from the engine cab, and which will dispense with the present necessity of one of the train crew manually releasing each car.

Another object of the invention is to provide an air release valve by which the brakes of a train may be quickly applied in case of emergency and in the event that the brakes should stick after their sudden application, they may be immediately released. The brakes of a train sometimes become stuck in descending a grade when the brakes are applied for safety purposes, but with this improved release valve, they may be released at will.

Another object of the invention is the provision of an air release valve adapted to be mounted on an air brake cylinder for bleeding the fluid pressure therefrom direct to the atmosphere instead of the usual method of passing it through the cars of a train before escaping to the atmosphere. By this arrangement a quick and positive reduction is obtained.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my improved air release valve mounted upon an air brake cylinder.

Figure 2 is a vertical longitudinal sectional view therethrough.

Figure 3 is a vertical transverse sectional view on the line 3—3 of Figure 2.

Figure 4 is a similar view on the line 4—4 of Figure 2.

Referring to the drawing by reference characters, the numeral A designates an air brake cylinder adapted to be mounted on a railway car for controlling the actuation of the brakes thereof and which is of the usual well-known construction in which a brake actuating plunger B is reciprocably mounted and to which a fluid pressure pipe C is connected. The pipe C leads to the main pressure reservoir whereby a pressure of a predetermined degree is maintained in the cylinder to hold the brakes in a released position.

Supported by brackets 10 upon the top of the air brake cylinder A is an auxiliary cylinder 11 having a piston head 12 reciprocably mounted therein from which a piston rod 13 extends through one of the end walls of the cylinder. An air pressure supply pipe 14 enters the cylinder 11 adjacent the opposite end thereof and leads to an auxiliary air pressure reservoir. An engineer's control valve 15 is arranged in the pipe 14 for controlling the flow of air to the auxiliary cylinder. An expansion spring 16 encircles the piston rod and is interposed between the piston head and the inner end of the cylinder to normally hold the piston in a retracted position.

Also mounted on the air brake cylinder A is a casing 17 arranged in axial alignment with the auxiliary cylinder but suitably spaced therefrom. The casing 17 has an air chamber 18 formed therein which communicates with the interior of the air brake cylinder through a duct 19 provided in an attaching nipple 20 by which the casing 17 is supported upon said air brake cylinder. The piston rod 13 extends through the casing 17 and through packing glands 21 provided in the ends of the casing for preventing the escape of air from the chamber 18. The piston rod 13 has an elongated slot 22 therein which is so positioned that it is out of communication with the chamber 18 when the piston is in a retracted position, but is capable of bridging the distance between the chamber 18 and the atmosphere when the piston is extended as shown in dotted lines in Figure 2 of the drawings.

In operation, the air brake cylinder is pumped with air to a predetermined pressure which is sufficient to hold the brakes of a car in an off or released position. The air to the cylinder A is of course controlled by the engineer's control valve. To apply the brakes of the car it is necessary to reduce the air pressure in the air brake cylinder which is accomplished by the opening of the valve 15 which is located in the cab of the engine within easy reach of the engineer. Upon the turning on of the valve 15, air under pressure enters the cylinder 11 and a pressure is built up therein, sufficient to move the piston 12 outward against the action of the spring 16 whereupon the slot 22 bridges the space between chamber 18 and the atmosphere, thus releasing a predetermined amount of air from the air brake cylinder which reduction in pressure allows the spring D to operate the piston E in the cylinder A for applying the brakes of the car. After the piston has been extended and the desired reduction has been made, the valve 15 is shut-off and the air in the cylinder 11 is gradually bled to the atmosphere through a bleed opening 23 in the outer end wall of the cylinder 11, whereupon the spring 16 will return the piston to normal position to disestablish communication between the chamber 18 and the atmosphere. To release the brakes, pressure is again built up in the air brake cylinder in the usual manner.

For manually releasing the air in the air brake cylinder A, I provide a valve 24 in the top of the casing 17 which is operable by a handle or lever 25.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. An auxiliary control device for air brake systems comprising in combination with a system having an air pressure cylinder, said cylinder adapted to retain the brakes of the system in a released position by the pressure therein, a casing mounted on said cylinder and communicating with the interior of the latter, an auxiliary cylinder also mounted on said first cylinder in axial alignment with said casing, a piston having a slotted rod mounted in said casing and in said auxiliary cylinder, the head of the piston carried in said latter cylinder adjacent one end thereof, the slot of said rod adapted to be disposed in the atmosphere between said latter cylinder and said casing, an air pressure supply pipe mounted on said auxiliary cylinder between the aforesaid end of the latter and the head of said piston, and a valve carried on said pipe for admitting air on the pressure to said auxiliary cylinder for moving said piston including its rod to dispose said slot between the atmosphere and the interior of said casing, thereby providing communication between the atmosphere and the interior of said first mentioned cylinder to reduce the pressure in the latter for applying the brakes.

2. An auxiliary control device for air brake systems comprising in combination with a system having an air pressure cylinder, said cylinder adapted to retain the brakes of the system in a released position by the pressure therein, a casing mounted on said cylinder and communicating with the interior of the latter, an auxiliary cylinder also mounted on said first cylinder in axial alignment with said casing, a piston having a head in said auxiliary cylinder adjacent one end of the latter, the rod of said piston movable through the opposite end of said cylinder and through said casing, said rod having a slot therein, a spring on said rod within said cylinder to maintain the slot of said rod in the atmosphere between the casing and the auxiliary cylinder, the latter being spaced from said casing, an air pressure supply pipe mounted on said auxiliary cylinder between the first mentioned end of said cylinder and said piston head, and a valve carried on said pipe for admitting air under pressure to said auxiliary cylinder for moving said piston against the action of said spring to dispose said slot between the interior of said casing and the atmosphere thereby providing communication between the interior of said first mentioned cylinder and the atmosphere to release the pressure from said first mentioned cylinder for applying the brakes of the system.

In testimony whereof I have affixed my signature.

CHRISTOPHER L. MACKEY.